United States Patent
Morita et al.

(10) Patent No.: US 11,181,639 B2
(45) Date of Patent: Nov. 23, 2021

(54) MEASUREMENT DEVICE, MEASUREMENT METHOD, AND CONTROL PROGRAM FOR MEASUREMENT DEVICE

(71) Applicant: TOPCON CORPORATION, Tokyo (JP)

(72) Inventors: Hideki Morita, Tokyo (JP); Ken'ichiro Yoshino, Tokyo (JP); Yasushi Tanaka, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 901 days.

(21) Appl. No.: 15/936,628

(22) Filed: Mar. 27, 2018

(65) Prior Publication Data
US 2018/0284281 A1    Oct. 4, 2018

(30) Foreign Application Priority Data

Mar. 31, 2017   (JP) .............................. JP2017-069965

(51) Int. Cl.
*G01S 17/00*     (2020.01)
*G01S 17/42*     (2006.01)
(Continued)

(52) U.S. Cl.
CPC ............ *G01S 17/42* (2013.01); *G01B 11/002* (2013.01); *G01C 15/002* (2013.01); *G01S 7/4811* (2013.01)

(58) Field of Classification Search
USPC ............................................. 356/4.01, 5.01
See application file for complete search history.

(56) References Cited

U.S. PATENT DOCUMENTS 6,141,105 A * 10/2000 Yahashi ............... G01B 11/005
                                                              356/623
7,092,076 B2 *  8/2006 Ohtomo ............... G01C 15/002
                                                              356/11
(Continued)

FOREIGN PATENT DOCUMENTS

DE      102012112987 B3    12/2013
EP          2096404 A2      9/2009
(Continued)

OTHER PUBLICATIONS

Extended European Search Report dated Jun. 11, 2018 in connection with EP Application No. 18164174.7; 7 pgs.
(Continued)

*Primary Examiner* — James R Hulka
(74) *Attorney, Agent, or Firm* — Chiesa Shahinian & Giantomasi PC

(57) ABSTRACT

Provided is a measurement device or the like that expands a dynamic range easily and promptly as appropriate even when three-dimensional data or the like on some parts of a measurement target object is not acquirable, so that the data can be acquired. A measurement device includes a light source unit that sequentially emits a plurality of beams of distance measurement light to an identical target object, based on predetermined fixed output information, a light reception unit that receives reflected light, from the target object, based on which the measurement device acquires measurement information, and an output value reducing unit and/or an input value reducing unit, the output value reducing unit reducing an output value of the light source unit, the input value reducing unit reducing an input value of the reflected light to the light reception unit.

5 Claims, 14 Drawing Sheets

(51) Int. Cl.
   *G01B 11/00*   (2006.01)
   *G01C 15/00*   (2006.01)
   *G01S 7/481*   (2006.01)

(56) References Cited

U.S. PATENT DOCUMENTS

| | | | | |
|---|---|---|---|---|
| 8,351,025 | B2* | 1/2013 | Ootani | G01C 15/002 |
| | | | | 356/3.01 |
| 10,310,084 | B2* | 6/2019 | Murai | G01S 17/10 |
| 2003/0142287 | A1 | 7/2003 | Ohishi et al. | |
| 2004/0051711 | A1* | 3/2004 | Dimsdale | G01B 11/002 |
| | | | | 345/419 |
| 2004/0207832 | A1 | 10/2004 | Ohtomo et al. | |
| 2005/0099637 | A1* | 5/2005 | Kacyra | G01B 11/002 |
| | | | | 356/601 |
| 2008/0068585 | A1 | 3/2008 | Minegishi et al. | |
| 2009/0220145 | A1 | 9/2009 | Ootani et al. | |
| 2016/0320486 | A1 | 11/2016 | Murai et al. | |
| 2017/0068393 | A1* | 3/2017 | Viswanathan | H04N 9/3194 |
| 2020/0341146 | A1* | 10/2020 | Dussan | G01S 7/4811 |

FOREIGN PATENT DOCUMENTS

| | | |
|---|---|---|
| JP | 2003-185747 A | 7/2003 |
| JP | 2004-317259 A | 11/2004 |
| JP | 2008-076145 A | 4/2008 |
| JP | 2008-082782 A | 4/2008 |
| JP | 2009-204449 A | 9/2009 |
| JP | 5466807 B2 | 4/2014 |
| WO | 2015107869 A1 | 7/2015 |

OTHER PUBLICATIONS

Notification of Reasons for Refusal dated Mar. 3, 2021, in connection with Japanese Patent Application No. 2017-069965, 10 pgs. (including translation).

* cited by examiner

F I G. 1
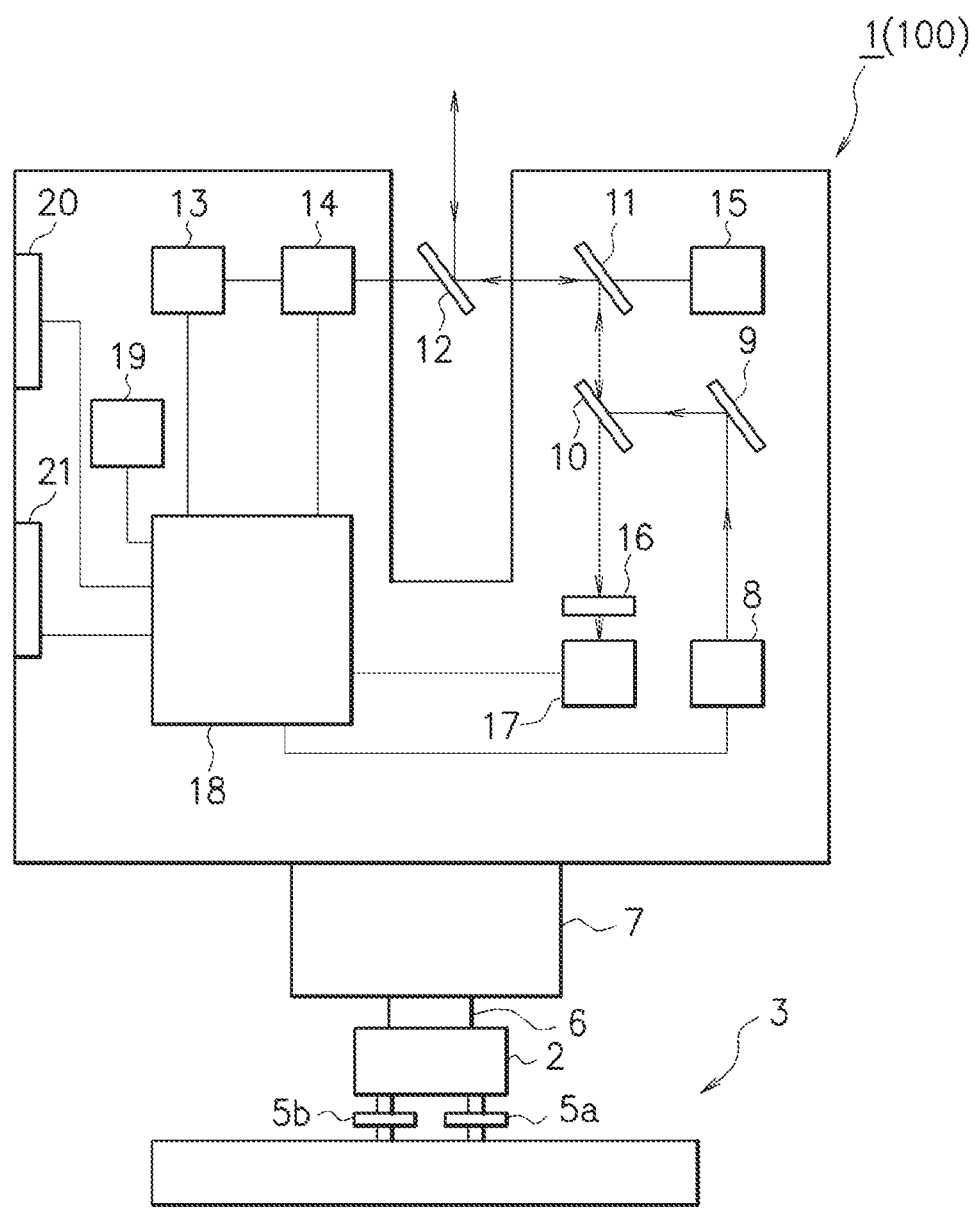

- 31 LASER EMITTING PROCESSING UNIT (PROGRAM) (STORES DISTANCE MEASUREMENT LIGHT EMISSION TIME POINT INFORMATION IN WHICH DISTANCE MEASUREMENT LIGHT EMISSION INFORMATION FOR EMITTING LASER BEAMS AT PREDETERMINED INTERVAL AND TIME POINT INFORMATION ARE ASSOCIATED WITH EACH OTHER)

- 32 STANDARD OUTPUT INFORMATION STORAGE UNIT

- 33 DISTANCE MEASUREMENT LIGHT EMISSION TIME POINT INFORMATION STORAGE UNIT (STORES "DISTANCE MEASUREMENT LIGHT EMISSION TIME POINT INFORMATION")

- 34 HORIZONTAL ROTATION TIME POINT INFORMATION STORAGE UNIT (STORES "HORIZONTAL ROTATION TIME POINT INFORMATION" IN WHICH ROTATION INFORMATION OF "HORIZONTAL ROTATION UNIT" AND TIME POINT INFORMATION ARE ASSOCIATED WITH EACH OTHER)

- 35 VERTICAL DRIVING TIME POINT INFORMATION STORAGE UNIT (STORES "VERTICAL DRIVING TIME POINT INFORMATION" IN WHICH DRIVING INFORMATION OF "VERTICAL DRIVING UNIT" AND TIME POINT INFORMATION ARE ASSOCIATED WITH EACH OTHER)

- 36 REFLECTED LIGHT PROCESSING UNIT (PROGRAM) (STORES "REFLECTED DISTANCE MEASUREMENT LIGHT TIME POINT INFORMATION" IN WHICH REFLECTED DISTANCE MEASUREMENT LIGHT INFORMATION ON LIGHT RECEIVED BY PHOTODETECTOR AND TIME POINT INFORMATION ARE ASSOCIATED WITH EACH OTHER)

- 37 REFLECTED DISTANCE MEASUREMENT LIGHT TIME POINT INFORMATION STORAGE UNIT (STORES "REFLECTED DISTANCE MEASUREMENT LIGHT TIME POINT INFORMATION")

- 38 FIRST DISTANCE INFORMATION CALCULATION PROCESSING UNIT (PROGRAM) (OPERATES TO CALCULATE "SECOND DISTANCE INFORMATION" ON EACH REFLECTED DISTANCE MEASUREMENT LIGHT TIME POINT INFORMATION BASED ON TIME DIFFERENCE INFORMATION INDICATING DIFFERENCE IN TIME POINT INFORMATION BETWEEN EACH REFLECTED DISTANCE MEASUREMENT LIGHT TIME POINT INFORMATION AND CORRESPONDING "DISTANCE MEASUREMENT LIGHT EMISSION TIME POINT INFORMATION")

FIG. 12

```
                              (B)
                               │
                               ▼                                    ST17
┌──────────────────────────────────────────────────────────────────────┐
│ CALCULATE "SECOND DISTANCE INFORMATION" ON EACH REFLECTED DISTANCE   │
│ MEASUREMENT LIGHT TIME POINT INFORMATION BASED ON TIME DIFFERENCE    │
│ INFORMATION INDICATING DIFFERENCE FROM TIME POINT INFORMATION ON     │
│ "DISTANCE MEASUREMENT LIGHT EMISSION TIME POINT INFORMATION"         │
│ CORRESPONDING TO "AMPLITUDE DECREASING WAVEFORM" OF "AMPLITUDE       │
│ DECREASING WAVEFORM INFORMATION" OF EACH REFLECTED DISTANCE          │
│ MEASUREMENT LIGHT TIME POINT INFORMATION, AND STORE THE INFORMATION  │
└──────────────────────────────────────────────────────────────────────┘
                               │                                    ST18
                               ▼
┌──────────────────────────────────────────────────────────────────────┐
│ CALCULATE "SECOND POSITION (COORDINATE) INFORMATION" ON EACH         │
│ REFLECTED DISTANCE MEASUREMENT LIGHT TIME POINT INFORMATION BASED ON │
│ SECOND DISTANCE INFORMATION, "HORIZONTAL ROTATION TIME POINT         │
│ INFORMATION" CORRESPONDING TO "AMPLITUDE DECREASING WAVEFORM" OF     │
│ "AMPLITUDE DECREASING WAVEFORM INFORMATION" OF EACH REFLECTED        │
│ DISTANCE MEASUREMENT LIGHT TIME POINT INFORMATION, AND CORRESPONDING │
│ "VERTICAL DRIVING TIME POINT INFORMATION", AND STORE INFORMATION     │
│ THUS CALCULATED                                                      │
└──────────────────────────────────────────────────────────────────────┘
                               │
  ( TO ST11 )                  ▼                         ST19
       ▲             ◇ HORIZONTAL ROTATION ◇
       └─── NO ─────◇ UNIT ROTATED BY 180°? ◇
                             ◇
                             │ YES
                             ▼                           ST20
┌──────────────────────────────────────────────────────────────────────┐
│ REFER TO "SECOND DISTANCE INFORMATION STORAGE UNIT" AND "SECOND      │
│ POSITION INFORMATION STORAGE UNIT", AND DETERMINE WHETHER OR NOT     │
│ THERE IS REFLECTED DISTANCE MEASUREMENT LIGHT TIME POINT INFORMATION │
│ NOT INCLUDING "SECOND DISTANCE INFORMATION" AND/OR "SECOND POSITION  │
│ INFORMATION"                                                         │
└──────────────────────────────────────────────────────────────────────┘
                             │
                             ▼                           ST21
              NO        ◇  FOUND ?  ◇
        ┌──────────────◇           ◇
        │                    │ YES
        │                    ▼                           ST22
        │        YES   ◇ MEASUREMENT COMPLETED ◇
        ├─────────────◇ UNDER ALL CONDITIONS?  ◇
        │                    │ NO
        ▼                    ▼                           ST23
     ( END )    ┌──────────────────────────────────────────────┐
                │ REDUCE OUTPUT OF SEMICONDUCTOR LASER, REDUCE │
                │ SENSITIVITY OF PHOTODETECTOR, DRIVE SHUTTER  │
                │ (AS IN ST9)                                  │
                └──────────────────────────────────────────────┘
                             │
                             ▼
                  ( EXECUTE ST1 TO ST7 )
```

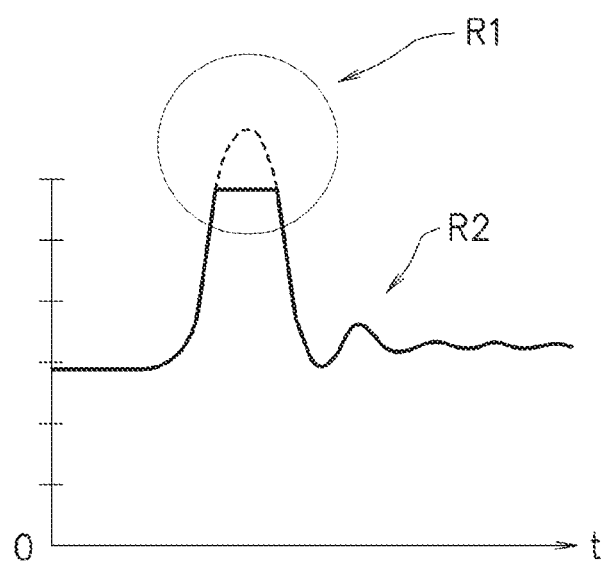
F I G. 15

MEASUREMENT DEVICE, MEASUREMENT METHOD, AND CONTROL PROGRAM FOR MEASUREMENT DEVICE

CROSS-REFERENCE TO RELATED APPLICATIONS

This application claims priority to Japanese Patent Application No. 2017-69965, filed Mar. 31, 2017, which is herein incorporated by reference in its entirety.

TECHNICAL FIELD

The present invention relates to, for example, a measurement device, a measurement method, and a control program for a measurement device that irradiate a measurement target object with distance measurement light to measure a distance to the measurement target object, and detect a light emitting direction of the distance measurement light to acquire three-dimensional data on the measurement target object.

BACKGROUND

Conventionally, for example, three-dimensional laser scanners have been generally known as three-dimensional measurement devices that acquire three-dimensional data (three-dimensional point cloud data) on multiple points on a measurement target object (see, for example, Japanese Patent No. 5466807).

Such a three-dimensional measurement device (three-dimensional laser scanner) irradiates a measurement target object with a pulse laser beam, which is an example of the distance measurement light, and receives reflected light of each pulse laser beam reflected on the measurement target object to measure the distance to the measurement target object. The three-dimensional measurement device further detects a light emitting direction (horizontal and vertical angles) of the distance measurement light to acquire three-dimensional data on the measurement target object.

For example, when the measurement target object is relatively highly reflective, an excessively large amount of reflected light might be reflected from a predetermined portion of the measurement target object, or reflected light with excessively high intensity might be reflected.

For example, the three-dimensional measurement device may acquire three-dimensional data on a pipe with a curved surface in a factory. In such a case, the intensity of the reflected light, reflected from the surface of the pipe, might largely vary among portions of the pipe.

For example, the three-dimensional measurement device may acquire three-dimensional data on an area including a road sign having a surface including a reflective material or the like. In such a case, the intensity of the reflected light, reflected from the surface of the sign, might be excessively higher than the intensity of reflected light reflected from a portion other than the surface of the sign.

These cases might result in the intensity of the reflected light overwhelming the maximum value of a dynamic range (a range defined by upper and lower limits of an appropriately-processable amount of light received from the measurement target object irradiated with light such as a pulse laser beam emitted from the three-dimensional measurement device).

When this happens, normal scanning by the three-dimensional measurement device might fail to acquire the three-dimensional data on some parts of the measurement target object.

When the three-dimensional data on some parts of the measurement target object fails to be acquired, a measurer might need to expand the dynamic range with a density filter or the like for example.

SUMMARY OF THE EMBODIMENTS

Some three-dimensional measurement devices feature high speed three-dimensional measurement. Unfortunately, such high speed measurement might be compromised with the measurer performing a cumbersome operation of expanding the dynamic range using the density filter or the like each time the three-dimensional measurement device fails to acquire three-dimensional data on a part of the measurement target object.

In view of the above, an object of the present invention is to provide a measurement device, a measurement method, and a control program for a measurement device that expand the dynamic range easily and promptly as appropriate when three-dimensional data or the like on a part of a measurement target object is not acquirable so that the data can be acquired.

The above-described object is achieved by a measurement device according to the present invention that includes a light source unit that sequentially emits a plurality of beams of distance measurement light to an identical target object, based on predetermined fixed output information, a light reception unit that receives reflected light, from the target object, based on which the measurement device acquires measurement information on the basis of the reflected light received by the light reception unit, and an output value reducing unit and/or an input value reducing unit, the output value reducing unit reducing a light output value of the light source unit, the input value reducing unit reducing an input value of the reflected light to the light reception unit.

The configuration includes the output value reducing unit that reduces the output value of the light source unit such as a laser (such as reduction in the laser output by 50% for example) and/or the input value reducing unit that reduces the input value of the reflected light to the light reception unit such as a photodetector (such as reduction of sensitivity of the photodetector and a film that reduces the sensitivity for example).

When an identical target object is sequentially irradiated with a plurality of beams of distance measurement light based on the predetermined fixed output information, a signal corresponding to the received light might have an excessively large value, due to an excessively short distance, depending on the measurement point or reflectivity of the target. As a result, the signal received by the reception unit is saturated, resulting in a failure to accurately acquire measurement information (a coordinate (position) value, distance information, and the like) on the point.

However, in the configuration, the output value reducing unit (such as reduction of the laser output by 50% for example) and/or the input value reducing unit that reduces the input value of the reflected light to the light reception unit such as a photodetector (such as reduction of sensitivity of the photodetector and a film that reduces the amount of received light for example) operates so that the saturation or the like of the "received signal" can be prevented. Thus, the measurement information (the coordinate (position) value, distance information, and the like) on the point that has not been acquirable can be accurately acquired.

Thus, with the configuration, the dynamic range can be easily and promptly expanded as appropriate even when three-dimensional data or the like on some parts of a measurement target object is not acquirable, so that the data can be acquired.

Furthermore, the configuration needs no additional photodetector with different sensitivity or the like for acquiring the received signal that is not accurately acquirable due to the saturation of the received signal or the like, and thus can have a simple structure and involves a smaller cost increase.

Preferably, the measurement device further includes a saturation information detection unit that detects saturation information on an amount of the reflected light received by the light reception unit, and the output value reducing unit and/or the input value reducing unit operates based on a detection result from the saturation information detection unit.

In the configuration, the output value reducing unit and/or input value reducing unit operates based on the detection result from the saturation information detection unit.

For example, the output value reducing unit and/or input value reducing unit operates after a saturated state is established where a signal corresponding to the received light has an excessively large value and thus the signal received by the reception signal or the like saturates, resulting in a failure to accurately acquire the measurement information (the coordinate (position) value, distance information, and the like) on the point. Thus, extremely highly effective acquisition of the measurement information (the coordinate (position) value, distance information, and the like) on the point that has not been acquirable can be achieved.

Preferably, the input value reducing unit includes an arrangement and retraction mechanism for a sensitivity reduction film.

The above-described object is achieved by a measurement device according to the present invention that includes a light source unit that sequentially emits a plurality of beams of distance measurement light to an identical target object, based on predetermined fixed output information, and a light reception unit that receives reflected light, from the target object, based on which the measurement device acquires measurement information on the basis of the reflected light received by the light reception unit, and the measurement information is acquired from any one of waves in an amplitude decreasing waveform that is a waveform with an amplitude decreasing generated from a waveform of a reception signal corresponding to light received by the light reception unit.

In the configuration, the light source unit that sequentially emits the plurality of beams of distance measurement light to an identical target object, based on the predetermined fixed output information, the amplitude decreasing waveform is generated from a waveform of the signal corresponding to the light received by the light reception unit, and the measurement information (such as a position or distance) is acquired from the amplitude decreasing waveform.

The amplitude decreasing waveform, generated from the received signal, has an amplitude decreasing. A distance to a point or the like, position (coordinate) information, or the like can be acquired from the waveform.

Thus, in the configuration, for example, when the signal saturation or the like occurs with a first wave of the amplitude decreasing waveform based on the received signal corresponding to the light received by the light reception unit to result in a failure to acquire the measurement information from the waveform, the measurement information (such as a position or a distance) can be acquired from a second wave or after in the amplitude decreasing waveform involving no saturation.

Preferably, the measurement device further includes an output value reducing unit and/or an input value reducing unit, the output value reducing unit reducing an output value of the light source unit, the input value reducing unit reducing an input value of the reflected light to the light reception unit.

The configuration further includes the output value reducing unit that reduces the output value of the light source unit and/or the input value reducing unit that reduces the input value of the reflected light to the light reception unit.

Thus, even when an effective signal cannot be acquired from the amplitude decreasing waveform, the output value reducing unit that reduces the output value of the light source unit and/or the input value reducing unit that reduces the input value of the reflected light to the light reception unit operates so that effective measurement information can be acquired.

The above-described object is achieved by a measurement method according to the present invention that includes sequentially irradiating an identical target object with a plurality of beams of distance measurement light from a light source unit based on predetermined fixed output information, receiving reflected light from the target object with the light reception unit, acquiring measurement information based on the reflected light received by the light reception unit, and reducing an output value of the light source unit and/or an input value of the reflected light to the light reception unit.

The above-described object is achieved by a control program according to the present invention that causes a measurement device including a light source unit that emits light and a light reception unit that receives reflected light, from the target object, based on which the measurement device acquires measurement information on the basis of the reflected light received by the light reception unit, to perform a sequentially irradiating process to an identical target object with a plurality of beams of distance measurement light from the light source unit based on predetermined fixed output information, and a reducing process to an output value of the light source unit and/or an input value of the reflected light to the light reception unit.

The present invention has an advantage of providing a measurement device, a measurement method, and a control program for a measurement device that expand the dynamic range easily and promptly as appropriate even when three-dimensional data or the like on some parts of a measurement target object is not acquirable, so that the data can be acquired.

BRIEF DESCRIPTION OF THE DRAWINGS

FIG. 1 is a schematic view of a main configuration or the like of a three-dimensional measurement device that is an example of a measurement device according to the present invention.

FIG. 3 is a schematic block diagram illustrating a main configuration of a first various-information storage unit.

FIG. 12 is a schematic flowchart illustrating a main operation of the three-dimensional measurement device according to the second embodiment of the present invention.

FIG. 15 is a schematic view illustrating a signal waveform as a target of the present embodiment.

DESCRIPTION OF THE EMBODIMENTS

Figure 2:
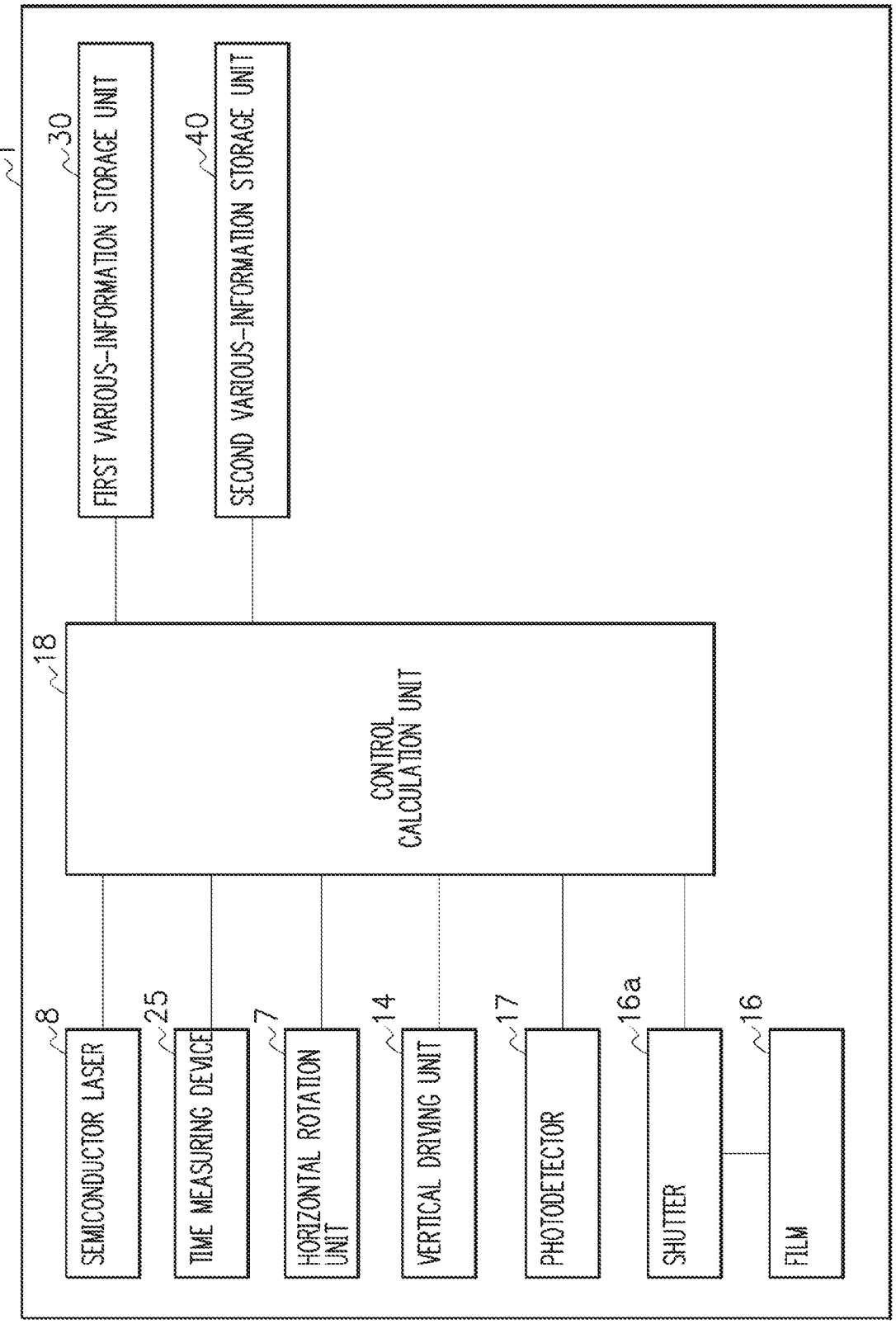
FIG. 2 is a schematic block diagram illustrating a main configuration of the three-dimensional measurement device illustrated in FIG. 1.

Preferred embodiments of the present invention are described below in detail with reference to the attached drawings.

The embodiments described below are preferred examples of the present invention and thus have various technically preferable limitations. However, the scope of the present invention is not limited to these unless stated otherwise in the following description.

FIG. 1 is a schematic view of a main configuration or the like of a three-dimensional measurement device 1 that is an example of a measurement device according to the present invention.

As illustrating in FIG. 1, the three-dimensional measurement device 1 includes a leveling unit 3 to be capable of being attached to a tripod (not illustrated).

The leveling unit 3 includes leveling screws 5a and 5b enabling adjustment of inclination of a base unit 2 on the leveling unit 3.

A horizontal rotation unit 7 is provided on the base unit 2 via a bearing 6. The horizontal rotation unit 7 is supported by the bearing 6 to be capable of rotating (turn) in a horizontal direction.

A frame unit 4 is formed on the horizontal rotation unit 7. Thus, when the horizontal rotation unit 7 rotates, the frame unit 4 can similarly rotate (turn) in the horizontal direction. Next, a main configuration in the frame unit 4 is described.

First of all, as illustrated in FIG. 1, a semiconductor laser 8 is provided as an example of a light source unit. Distance measurement light emitted from the semiconductor laser 8 is reflected by a mirror 9 and then is reflected by a first beam splitter 10 to reach a second beam splitter 11. The distance measurement light is reflected by the second beam splitter 11 to reach a scanning mirror 12.

The frame unit 4 includes a vertical angle detection unit 13 and a vertical driving unit 14 that is connected to the scanning mirror 12. Thus, when the vertical driving unit 14 rotates (pivots) a shaft connected to the scanning mirror 12 in a vertical direction, the scanning mirror 12 similarly rotates in the vertical direction or makes other like actions.

Due to the rotation or the like of the scanning mirror 12, the distance measurement light emitted in a direction toward the target object (measurement target object), that is, in an upper direction in FIG. 1 reaches the target object, to be reflected. The resultant reflected light returns to the scanning mirror 12 in FIG. 1 to be reflected to reach the second beam splitter 11. The second beam splitter 11 directs a part of the reflected light to an imaging unit 15 to be an image. The remaining part of the reflected light is reflected by the second beam splitter 11, and transmits through the first beam splitter 10 to be received by a photodetector 17, which is an example of a light reception unit, via a film 16. Then, information on the distance to and a position (coordinates) of the target object is calculated and acquired.

The film 16 is an example of an input value reducing unit or a sensitivity reduction film, and reduces the amount of the reflected light. The film 16 can be arranged at or retracted from a portion in front of the photodetector 17, with a shutter mechanism (not illustrated).

Thus, the film 16 is disposed at a retracted position when not required. The configuration and the like of the film 16 will be described later.

The frame unit 4 illustrated in FIG. 1 includes a control calculation unit 18 that controls the units, an acceleration sensor 19, a display unit 20, and an operation unit 21.

The three-dimensional measurement device 1 illustrated in FIG. 1 rotates the scanning mirror 12 in the vertical direction to emit the distance measurement light, which is a laser beam, to the outside. In this process, the horizontal rotation unit 7 also rotates. Thus, the entire measurement range can be irradiated with the distance measurement light. The full 360° range can be irradiated with the distance measurement light with the horizontal rotation unit 7 rotating by 180°.

The three-dimensional measurement device 1 illustrated in FIG. 1 includes a computer. The computer includes a central processing unit (CPU), a random access memory (RAM), a read only memory (ROM), and the like (not illustrated) connected to each other through a bus or the like.

FIG. 2 is a schematic block diagram illustrating a main configuration of the three-dimensional measurement device 1 illustrated in FIG. 1. As illustrated in FIG. 2, the control calculation unit 18 described above is provided and controls the semiconductor laser 8, the horizontal rotation unit 7, the vertical driving unit 14, and the photodetector 17 described above as well as a shutter 16a, to arrange the film 16 to be in front of the photodetector 17 or at the retracted position. The control calculation unit 18 also controls a time measuring device 25.

Figure 4:
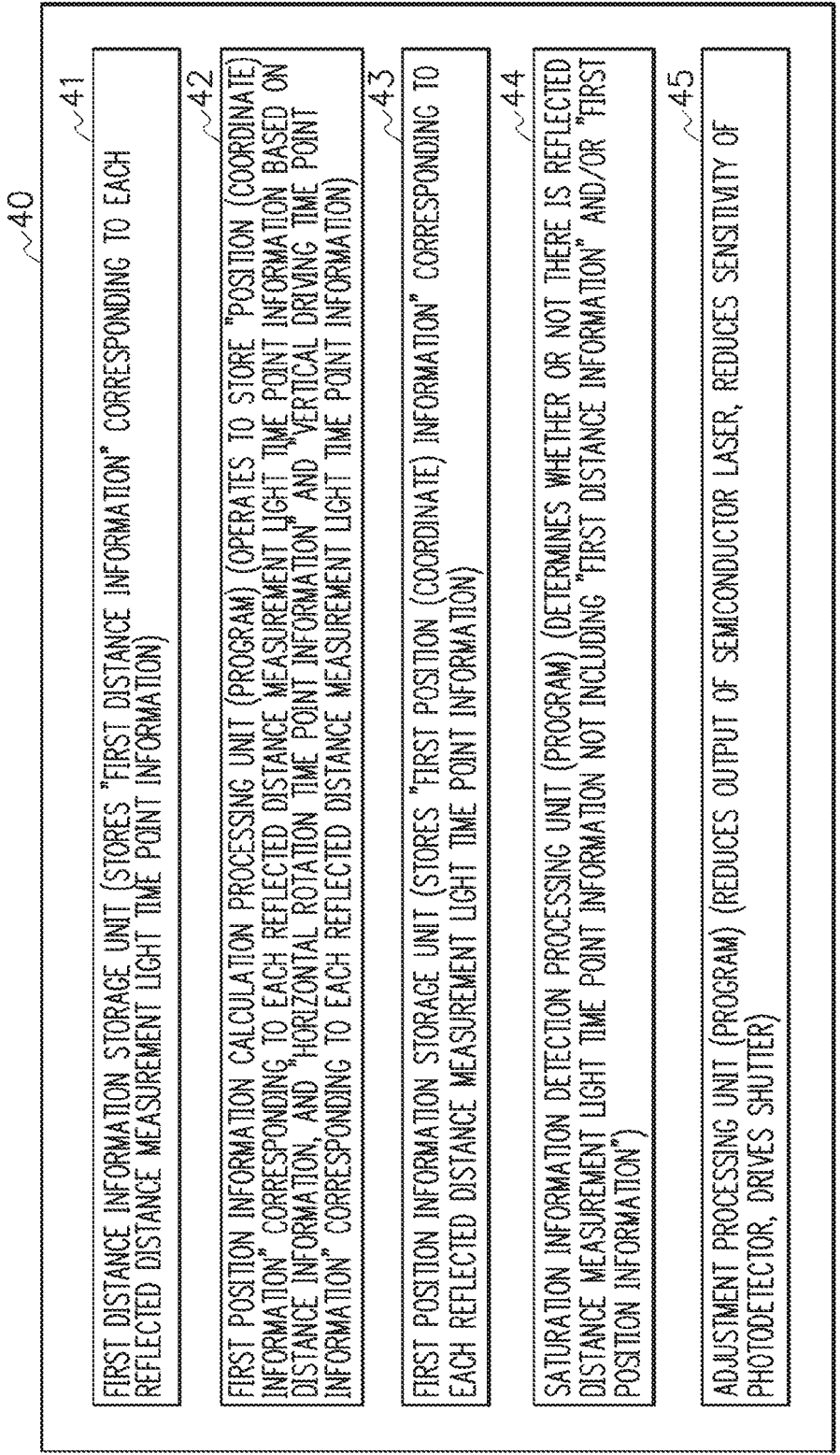
FIG. 4 is a schematic block diagram illustrating a main configuration of a second various-information storage unit.

The control calculation unit 18 further controls a "first various-information storage unit 30" and a "second various-information storage unit 40" illustrated in FIG. 2. FIG. 3 and FIG. 4 are schematic block diagrams respectively illustrating main configurations of the "first various-information storage unit 30" and the "second various-information storage unit 40". The details of the storage unit 30 and the like are described later.

Figure 5:
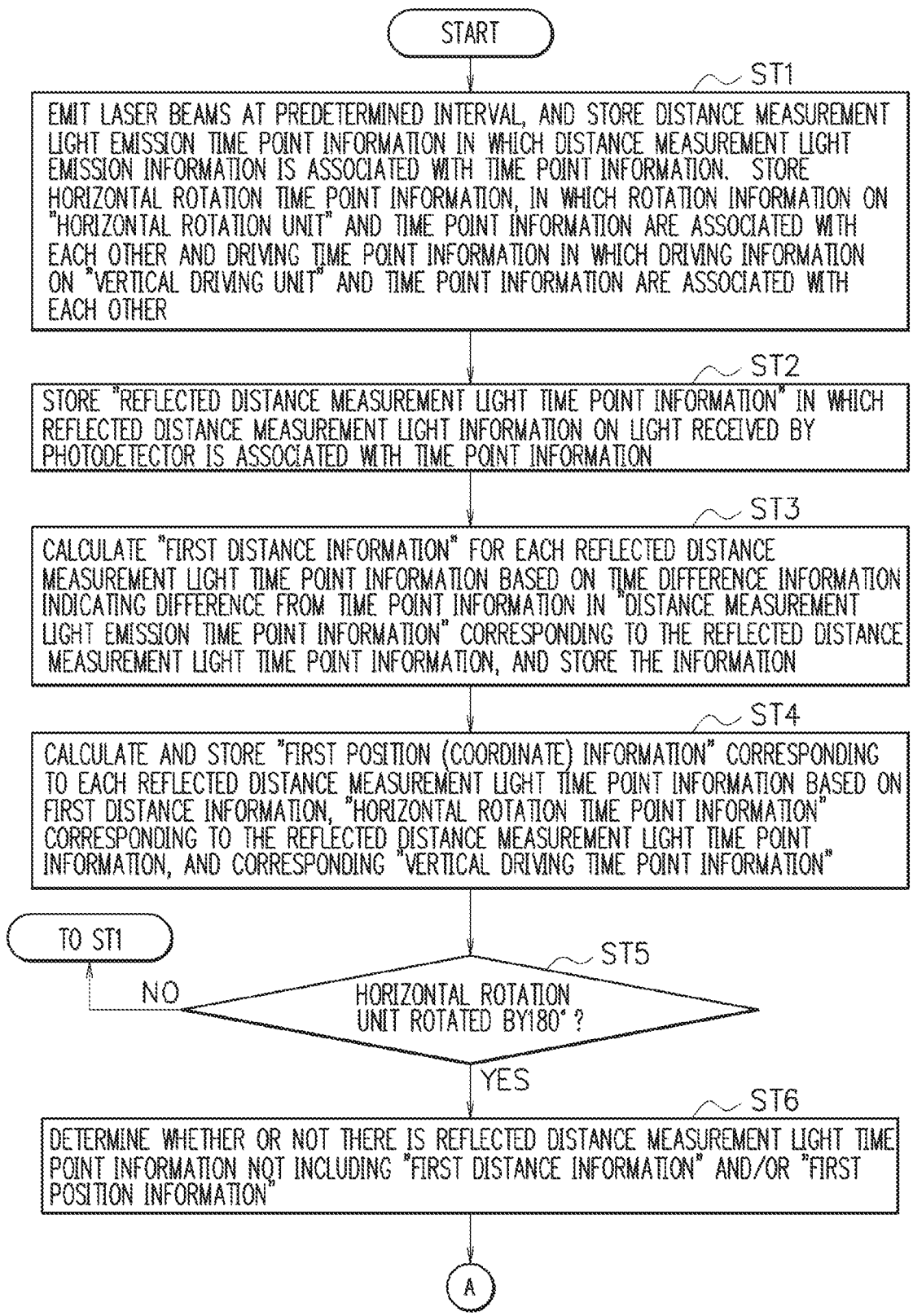
FIG. 5 is a schematic flowchart illustrating an example of a main operation of the three-dimensional measurement device according to an embodiment.
Figure 6:
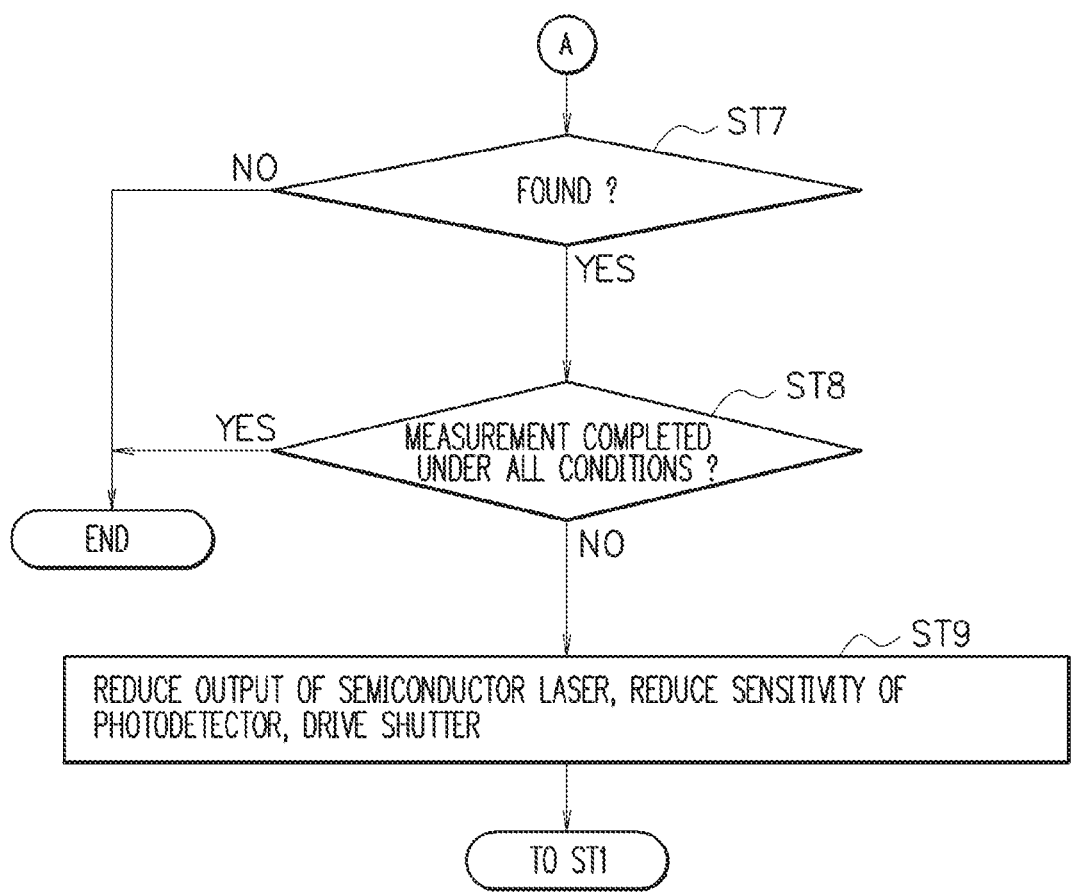
FIG. 6 is a schematic flowchart illustrating an example of a main operation of the three-dimensional measurement device according to the present embodiment.

FIG. 5 and FIG. 6 are each a schematic flowchart illustrating an example of a main operation of the three-dimensional measurement device 1 according to the present embodiment. A measurement process performed by the three-dimensional measurement device 1 illustrated in FIG. 1 is described below along with the configurations illustrated in FIGS. 1 to 4 and the like.

A user of the three-dimensional measurement device 1 illustrated in FIG. 1 mounts the three-dimensional measurement device 1 illustrated in FIG. 1 on the tripod, adjusts an angle with the leveling screws 5a and 5b and the like, and then performs the three-dimensional measurement for a target object (such as a building). First of all, in step (hereinafter, referred to as "ST") 1 in FIG. 5, a "laser emitting processing unit (program) 31" in FIG. 3 operates and refers to an "output value of the semiconductor laser 8" in a "standard output information storage unit 32" stored in advance as illustrated in FIG. 3.

The storage unit stores therein a standard output value of the semiconductor laser 8. The standard output information storage unit 32 according to the present embodiment stores therein one unique type of data.

The laser beams are sequentially emitted at a predetermined interval (distance measurement light emission), and "distance measurement light emission time point information", in which distance measurement light emission information and time point information are associated with each other, is stored in a "distance measurement light emission time point information storage unit 33" in FIG. 3. Thus, emission time point information on the semiconductor laser 8 is stored.

As described above, the "horizontal rotation unit 7" and the "vertical driving unit 14" are concurrently driven, and thus "horizontal rotation time point information", in which rotation information and the time point information are associated with each other and "driving time point information", in which driving information and the time point information are associated with each other are respectively stored in a "horizontal rotation time point information storage unit 34" and a "vertical driving time point information storage unit 35" in FIG. 3.

As described above, the distance measurement light is emitted via the scanning mirror 12 rotating in the vertical direction as illustrated in FIG. 1, while the frame unit 4 is rotating in the horizontal direction. Thus, information on position (coordinate) calculation for the target object is essential.

Next, the processing proceeds to ST2. In ST2, the photodetector 17 illustrated in FIG. 1 receives the reflected light. In response to this, a "reflected light processing unit (program) 36" illustrated in FIG. 3 operates, and stores "reflected distance measurement light time point information" in which "reflected distance measurement light information" on the light received by the photodetector 17 and the time point information are associated with each other in a "reflected distance measurement light time point information storage unit 37" in FIG. 3. With this process, signal information on the reflected light received by the photodetector 17 is stored together with the time point information.

Next, the processing proceeds to ST3. In ST3, a "first distance information calculation processing unit (program) 38" in FIG. 3 operates to calculate "first distance information" on each reflected distance measurement light time point information and stores the information in a "first distance information storage unit 41" in FIG. 4. The calculation is based on time difference information indicating difference in time point information between "each reflected distance measurement light time point information" in the "reflected distance measurement light time point information storage unit 36" in FIG. 3 and corresponding "distance measurement light emission time point information" in the "distance measurement light emission time point information storage unit 33" in FIG. 3.

Thus, "distance information" is acquired by based on the time difference information as a result of comparing the time point information indicated by the "each reflected distance measurement light time point information" in which each reflected light received by the photodetector 17 is associated with time point information with time point information indicated by the "distance measurement light emission time point information" indicating an emission instruction time point. Thus, distance information (an example of measurement information) indicating a distance to each point of the target object can be acquired.

Next, the processing proceeds to ST4. In ST4, a "first position information calculation processing unit (program) 42" in FIG. 4 operates to calculate "position (coordinate) information" corresponding to each reflected distance measurement light time point information, and stores the information in a "position information storage unit 43" in FIG. 4. The calculation is based on the first distance information in the "first distance information storage unit 41" in FIG. 4, the "horizontal rotation time point information" in the "horizontal rotation time point information storage unit 34" in FIG. 3 and "vertical driving time point information" in the "vertical driving time point information storage unit 35" in FIG. 3 that correspond to each reflected distance measurement light time point information in the "reflected distance measurement light time point information storage unit 37" in FIG. 3.

Thus, the position (coordinate (X,Y,Z)) information (one example of the measurement information) is acquired with reference to and based on the distance information, the vertical position information, and the horizontal position information, associated with each other, with the time point that is the same as the "each reflected distance measurement light time point information" serving as the time point information indicating a time point at which the reflected light is received by the photodetector 17. The position information thus acquired is stored in the "position information storage unit 43" in FIG. 4.

Next, the processing proceeds to ST5. In ST5, whether or not the horizontal rotation unit 7 has rotated by 180° is determined. When the rotation has occurred, it is determined that the full (360°) range measurement as described above has been completed.

In ST6, a "saturation information detection processing unit (program) 44" in FIG. 4 that is an example of a saturation information detection unit operates, and refers to the "first distance information storage unit 41" and the "first position information storage unit 43" in FIG. 4 to determine whether or not there is reflected distance measurement light time point information not including "first distance information" and/or "first position information".

In the present embodiment, the laser output is uniform over the points of the measurement target object, resulting in a narrow dynamic range. Thus, depending on factors such as a short distance to a target and a highly reflective target (target object), a signal corresponding to the light received by the photodetector 17 might be large enough to saturate. Thus, failure to detect a peak value of the signal or the like may occur. In this case, the distance information or the position information might not be measurable in the processes described above, and is likely to be unmeasurable data (blank). The unmeasurable data (blank) is an example of saturation information.

Thus, in the present embodiment, whether or not there is a point (without position or distance information) with the unmeasurable data (blank) is determined in ST6, and then whether or not the measurement has been completed under all the conditions is determined in ST8. When the measurement is determined not to have been completed in ST8, the processing proceeds to ST9.

In ST9, an "adjustment processing unit (program) 45" in FIG. 4 operates to reduce an output of the semiconductor laser 8 (for example, by 50%) (an example of an output value reducing unit), reduce the sensitivity of the photodetector 17 (for example, ×100 to ×50), and drives the shutter 16a to arrange the film 16 in front of the photodetector 17. The reduction of the sensitivity of the photodetector 17 and the film 16 are each an example of the input value reducing unit.

With the output value of the semiconductor laser 8 reduced and the sensitivity and input of the photodetector 17 reduced, the 180° rotation is performed, and steps ST1 to ST5 described above are executed again. Thus, a signal corresponding to a point in the signal saturated state can be detected, whereby highly accurate measurement can be performed. In the present embodiment, the signal corresponding to a point in the signal saturated state can be detected also with the output of the semiconductor laser 8 reduced or the like, whereby a wider dynamic range can be effectively achieved to prevent cost increase.

Various dynamic ranges may be set with a reduction rate of the output value of the semiconductor laser 8, a reduction rate of the sensitivity of the photodetector 17, and the like or a combination of these appropriately set. This reduction of the output of the semiconductor laser 8 ensures that the dynamic range can be extremely easily expanded without fail when needed, and that the dynamic range can be easily set.

When the target object is relatively highly reflective, the reflected light of an excessively large amount or with excessively high intensity might be reflected from a predetermined portion of the target object. For example, the three-dimensional measurement device 1 may acquire three-dimensional data on a pipe with a curved surface in a factory. In such a case, the intensity of the reflected light, reflected from the surface of the pipe, might largely vary among portions of the pipe. For example, the three-dimensional measurement device 1 may acquire three-dimensional data on an area including a road sign having a surface including a reflective material or the like. In such a case, the intensity of the reflected light, reflected from the surface of the sign, might be excessively higher than the intensity of reflected light reflected from a portion other than the surface of the sign.

These cases might result in the intensity of the reflected light overwhelming the maximum value of a dynamic range. When this happens, normal scanning by the three-dimensional measurement device 1 might fail to acquire the three-dimensional data on some parts of the measurement target object. When the three-dimensional data on some parts of the measurement target object fails to be acquired, a measurer might need to expand the dynamic range with a density filter or the like for example.

The three-dimensional measurement device 1 features high speed three-dimensional measurement. Unfortunately, such high speed measurement might be compromised with the measurer performing a cumbersome operation of expanding the dynamic range using the density filter or the like each time the three-dimensional measurement device 1 fails to acquire three-dimensional data on a part of the measurement target object.

In view of the above, in the present embodiment, the dynamic range can be easily and promptly expanded as appropriate when three-dimensional data or the like on a part of a measurement target object is not acquirable so that the data can be acquired.

In the example described in the present embodiment, all of the reduction of the output of the semiconductor laser 8, the reduction of the sensitivity of the photodetector 17, and the film 16 are simultaneously implemented. However, the present invention is not limited to this. Specifically, one of these options may be implemented first, and then the other options may be additionally implemented one by one when the blank point is found in ST7.

Any two of the reduction of the output of the semiconductor laser 8, the reduction of the sensitivity of the photodetector 17, and the film 16 may be combined. In the present embodiment, when the point (without position or distance information) with the unmeasurable data (blank) is found in ST6 and ST7, the processing returns to ST1, and the horizontal rotation unit 7 is further rotated by 180° to be rotated by 360° in total. However, the present invention is not limited to this, and the following configuration may be employed.

Specifically, when the point (without position or distance information, saturated area) with the unmeasurable data (blank) is found in ST6 and ST7, only the blank point is irradiated with a laser beam based on position or distance information or the like on the blank point, so that the measurement information (position and distance information or the like) can be acquired. In this case, the three-dimensional measurement device 1 performs the additional measurement for the blank point only, and thus needs not to measure the entire range again. Thus, the measurement time can be largely reduced.

Figure 7:
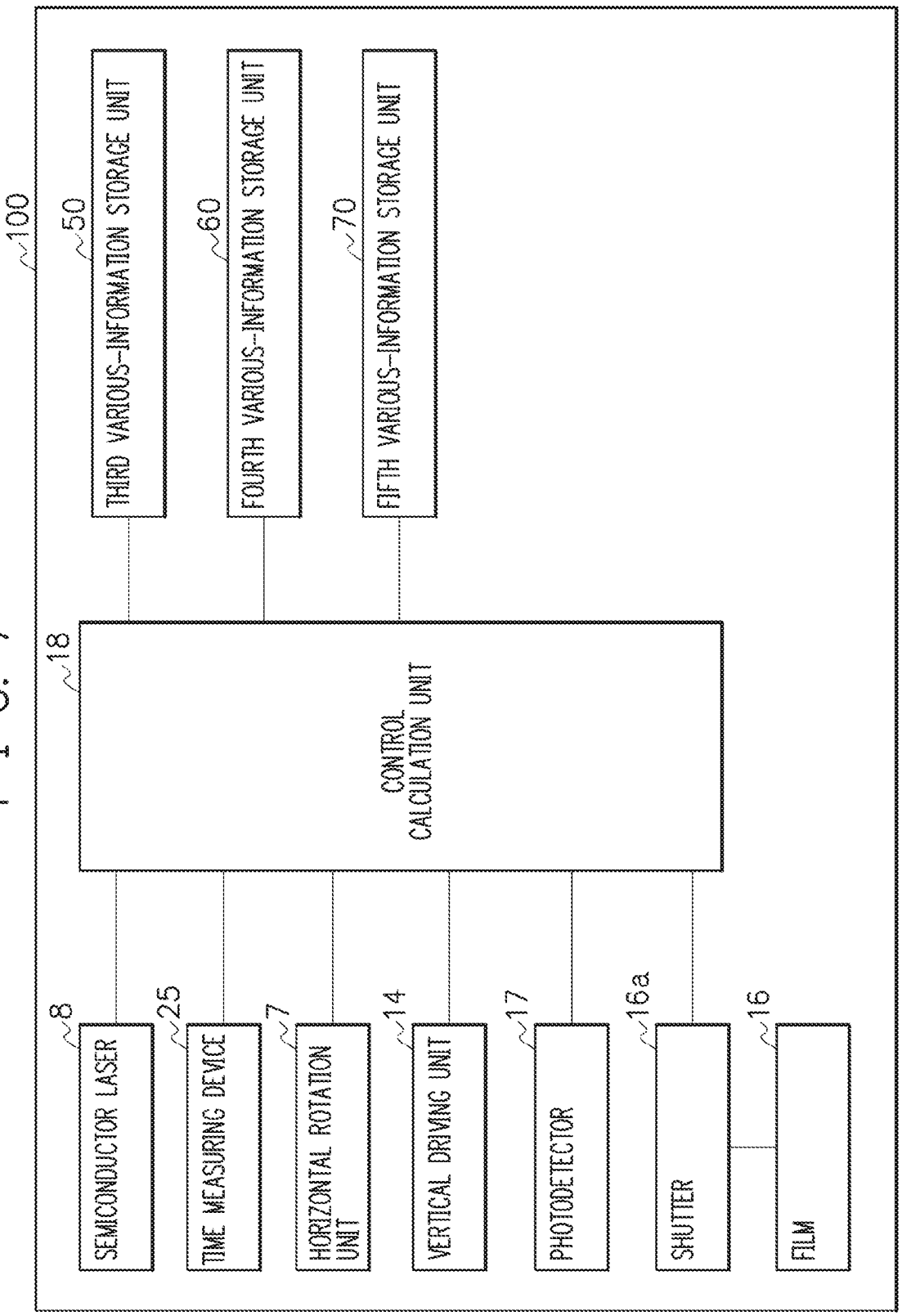
FIG. 7 is a schematic block diagram illustrating a main configuration of a three-dimensional measurement device according to a second embodiment of the present invention.

FIG. 7 is a schematic block diagram illustrating a main configuration of a three-dimensional measurement device 100 according to a second embodiment of the present invention. The present embodiment has many components that are the same as those in the first embodiment. The same components are denoted with the same reference numerals and will not be elaborated upon here. Differences from the first embodiment are mainly described below.

As illustrated in FIG. 7, the three-dimensional measurement device 100 according to the present embodiment includes the semiconductor laser 8, the time measuring device 25, the horizontal rotation unit 7, the vertical driving unit 14, the photodetector 17, the shutter 16a, and the film 16, as in the configuration of the three-dimensional measurement device 100 according to the first embodiment described above. The present embodiment is different from the first embodiment in that a "third various-information storage unit 50", a "fourth various-information storage unit 60", and a "fifth various-information storage unit 70" are provided.

Figure 8:
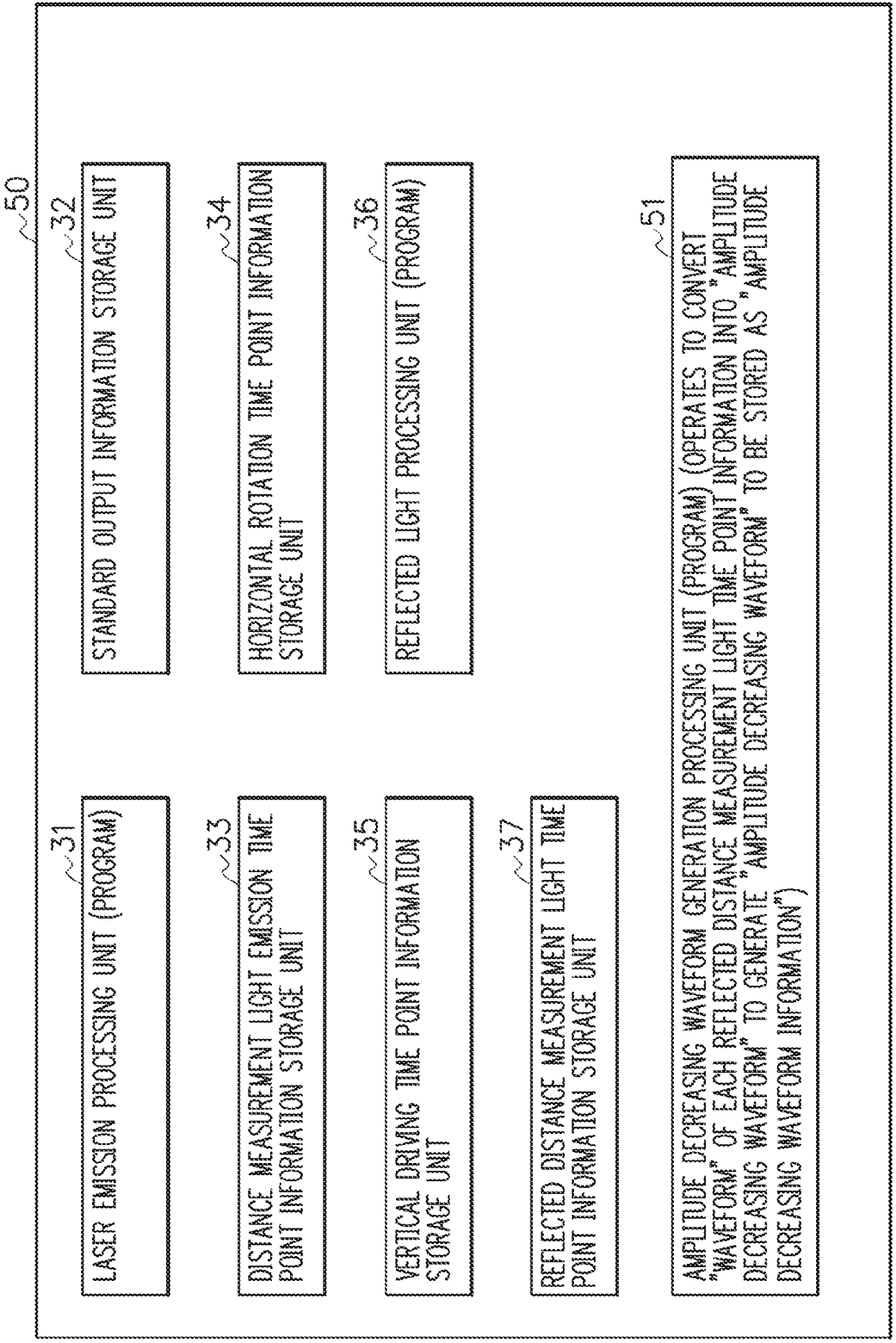
FIG. 8 is a schematic block diagram illustrating a main configuration of a third various-information storage unit.
Figure 9:
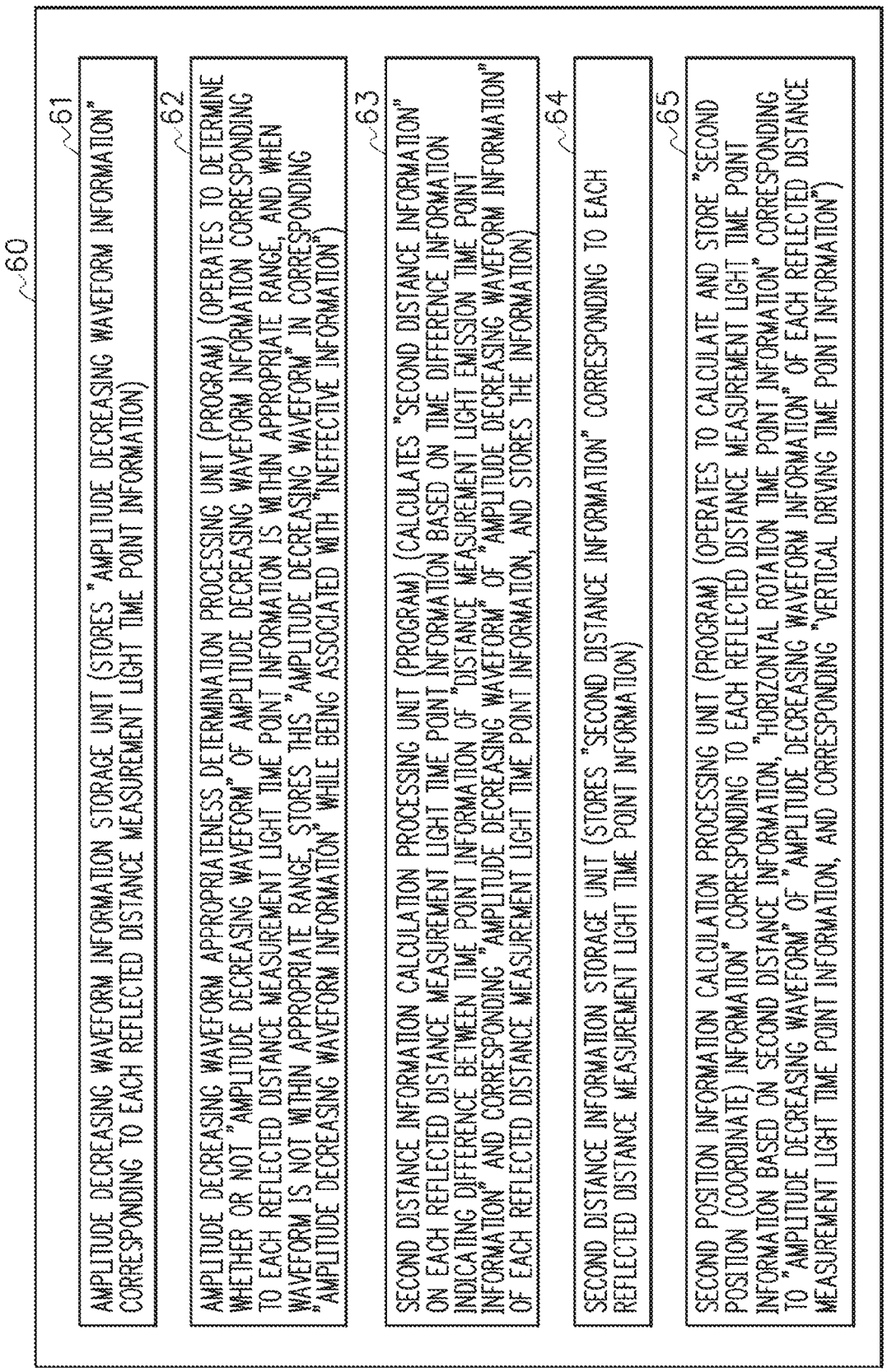
FIG. 9 is a schematic block diagram illustrating a main configuration of a fourth various-information storage unit.
Figure 10:
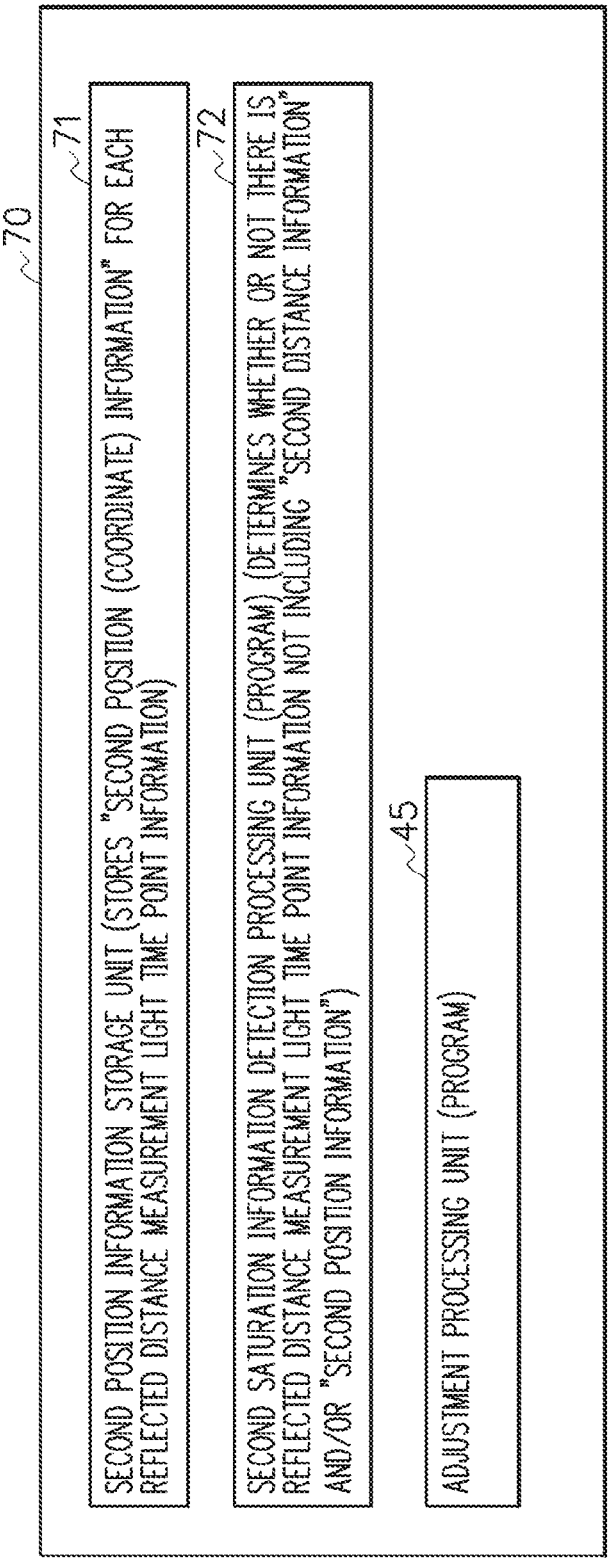
FIG. 10 is a schematic block diagram illustrating a main configuration of a fifth various-information storage unit.

FIG. 8 to FIG. 10 are schematic block diagrams respectively illustrating main configurations of the "third various-information storage unit 50", the "fourth various-information storage unit 60", and the "fifth various-information storage unit 70". The details of the storage unit 50 and the like are described later.

Figure 11:
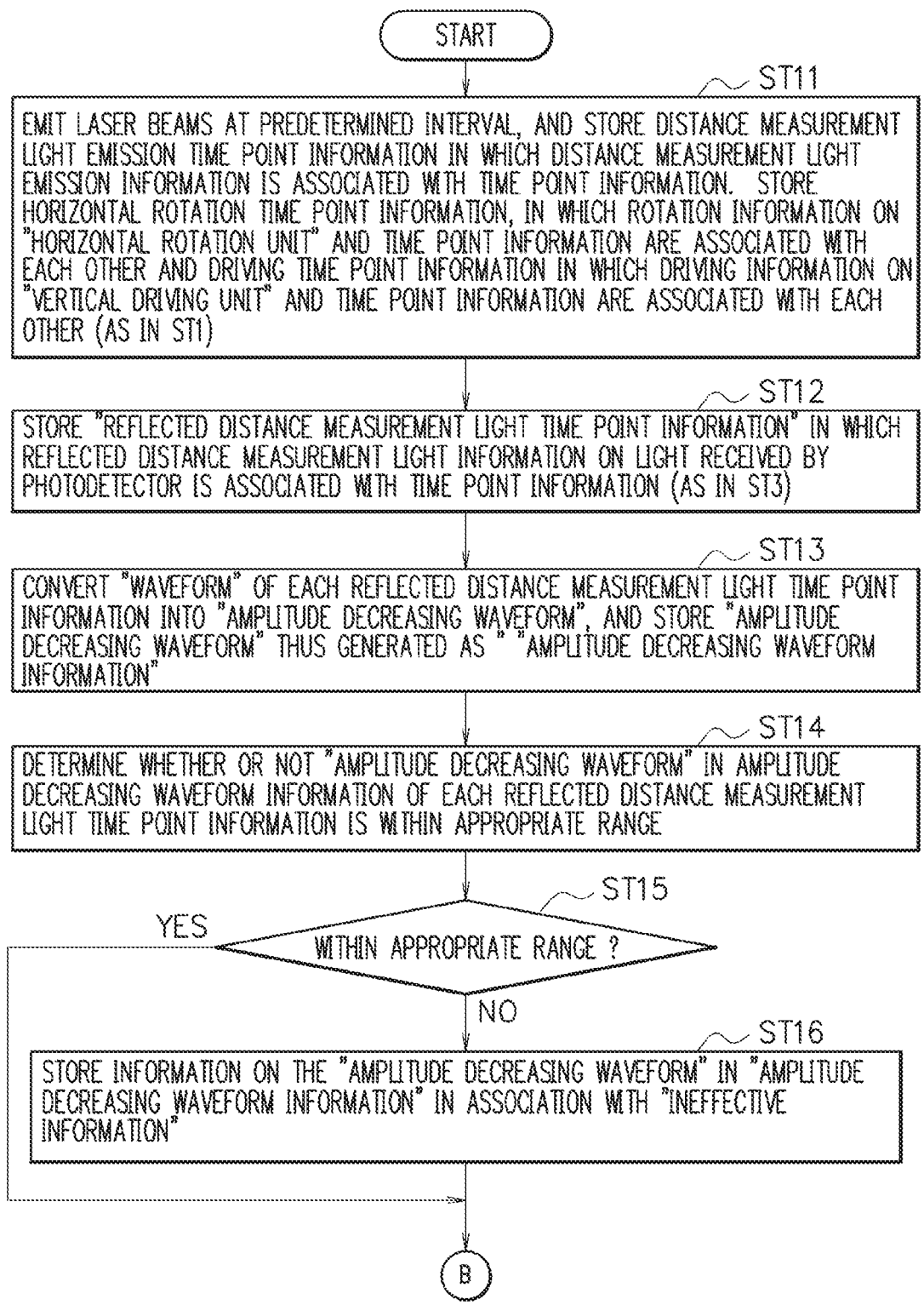
FIG. 11 is a schematic flowchart illustrating a main operation of the three-dimensional measurement device according to the second embodiment of the present invention.

FIG. 11 and FIG. 12 are each a schematic flowchart illustrating a main operation of the three-dimensional measurement device 100 according to the second embodiment of the present invention. As illustrated in FIG. 11, first of all, a user of the three-dimensional measurement device 100 according to the present embodiment executes processes in ST11 and ST12 in FIG. 11. The processes in ST11 and ST12 in FIG. 11 are respectively the same as those in ST1 and ST2 in the first embodiment described above. As a result of these processes, signal information on the reflected light received by the photodetector 17 is stored in association with time point information to be the "reflected distance measurement light time point information".

Next, the processing proceeds to ST13 in FIG. 11. In ST13, an "amplitude decreasing waveform generation processing unit (program) 51" in FIG. 8 operates to convert a "waveform" of each reflected distance measurement light time point information into an "amplitude decreasing waveform" to generate an "amplitude decreasing waveform".

Figure 13:
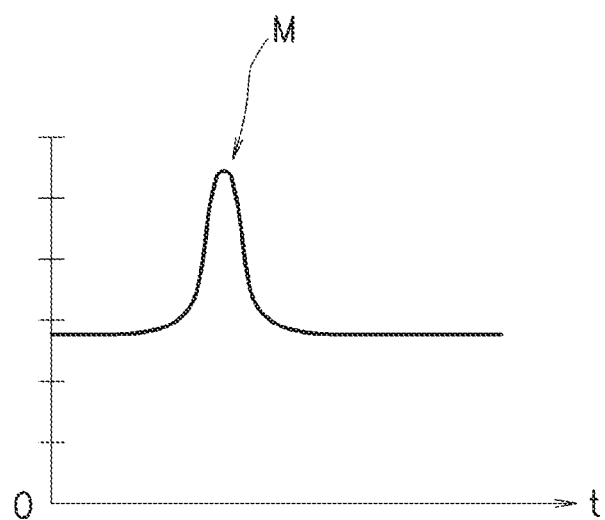
FIG. 13 is a schematic view illustrating a general signal waveform.

The amplitude decreasing waveform is described below. FIG. 13 is a schematic view illustrating a waveform of a normal signal. As illustrated in FIG. 13, a signal generally has a waveform indicated by an arrow M. The position or distance information is acquired based on a peak value or the like of the signal.

Figure 14:
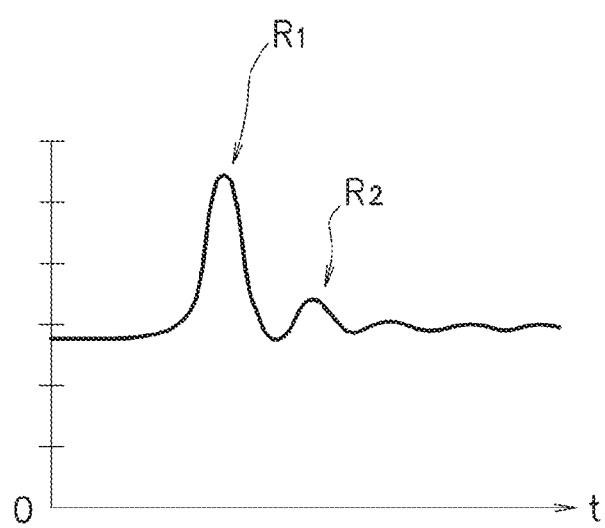
FIG. 14 is a schematic view illustrating an "amplitude decreasing waveform" generated by processing data based on the general waveform in FIG. 13.

FIG. 14 is a schematic view illustrating an "amplitude decreasing waveform" generated by an electrical circuit based on the general waveform in FIG. 13. As illustrated in FIG. 14, the amplitude decreasing waveform has an amplitude decreasing over time.

FIG. 15 is a schematic view illustrating a signal waveform as a target in the present embodiment. In the present embodiment, the output of the semiconductor laser 8 is uniform over the points of the measurement target object, resulting in a narrow dynamic range. Thus, depending on factors such as a short distance to a target and a highly reflective target (target object), a signal corresponding to the light received by the photodetector 17 might be large enough to saturate. Thus, the peak signal or the like fails to be detected as indicated by a broken line portion of a first wave (R1) of the amplitude decreasing waveform in FIG. 15.

In such a case, the position or distance information of the corresponding point is the unmeasurable data (blank), and thus the measurement data amount decreases. In view of this, in the present embodiment, when a signal is saturated at the first wave (R1) (the first wave of the amplitude decreasing waveform) to result in a detection failure, the measurement information is acquired with a second wave (R2) (the second wave of the amplitude decreasing waveform) or after with the same component.

Thus, in ST13, the "amplitude decreasing waveform", generated based on the waveform, is stored as the "amplitude decreasing waveform information" in an "amplitude decreasing waveform information storage unit 61" in FIG. 9.

Next, the processing proceeds to ST14. In ST14, an "amplitude decreasing waveform appropriateness determination processing unit (program) 62" in FIG. 9 operates to determine whether or not the "first wave (R1)" and the "second wave (R2)" of the amplitude decreasing waveform information, corresponding to each reflected distance measurement light time point information in the "amplitude decreasing waveform information storage unit 61" in FIG. 9, are within an appropriate range.

Specifically, when saturation is occurring at "R1" in FIG. 15 but "R2" is within the appropriate range, it is determined that R2 can be used as the measurement information after being subjected to predetermined processing.

Next, the processing proceeds to ST15, and then proceeds to ST16 when the waves are not within the appropriate range. In ST16, information on this "amplitude decreasing waveform" is stored in the corresponding "amplitude decreasing waveform information" in the "amplitude decreasing waveform information storage unit 61" in FIG. 9 while being associated with "ineffective information". Thus, the "amplitude decreasing waveform" associated with the ineffective information can be prevented from being used, whereby the reliability of the measurement information can be prevented from being compromised.

Next, the processing proceeds to ST17. In ST17, a "second distance information calculation processing unit (program) 63" in FIG. 9 operates to calculate "second distance information" on each reflected distance measurement light time point information, and stores the information in a "second distance information storage unit 64" in FIG. 9. The calculation is based on time difference information indicating a difference between the "amplitude decreasing waveform" of the "amplitude decreasing waveform information" of each reflected distance measurement light time point information in the "amplitude decreasing waveform information storage unit 61" in FIG. 9 and the corresponding "distance measurement light emission time point information" in the "distance measurement light emission time point information storage unit 33" in FIG. 8.

Thus, in this process, when the detection fails due to saturation at "R1" as illustrated in FIG. 15, "R2" can be used to calculate and acquire distance information on the point of the corresponding each reflected distance measurement light time point information. Thus, a light reception range unable to be measured with R1 can be measured with R2 or after, whereby the dynamic range is technically widened. This technique can be implemented without increasing parts such as an electrical circuit, and thus results in a device that is favorable also in terms of cost.

Next, the processing proceeds to ST18. In ST18, a "second position information calculation processing unit (program) 65" in FIG. 9 operates to acquire the "second distance information" in the "second distance information storage unit 64" in FIG. 9, the "horizontal rotation time point information" in the "horizontal rotation time point information storage unit 34" in FIG. 8 corresponding to the "amplitude decreasing waveform" of the "amplitude decreasing waveform information" of the "each reflected distance measurement light time point information" in the "amplitude decreasing waveform information storage unit 61" in FIG. 9, and the corresponding "vertical driving time point information" in the "vertical driving time point information storage unit 35" in FIG. 8.

The "second position (coordinate) information" is calculated for each reflected distance measurement light time point information based on these pieces of information, and stores the resultants information in a "second position information storage unit 71" in FIG. 10.

The position (coordinate) information on the point of the target object can also be acquired by calculating the position information on the point for each reflected distance measurement light time point information with "R2" when "R1" is saturated to result in the detection failure as in FIG. 15, as in the case of the distance information described above. Thus, the dynamic range can be widened without increasing parts such as a circuit.

Then, the processing proceeds to ST19. In ST19, whether or not the horizontal rotation unit 7 has rotated by 180° is determined. When the rotation has occurred, it is determined that the full range (360°) measurement has completed as described above, and the processing proceeds to ST20.

In ST20, a "second saturation information detection processing unit (program) 72" in FIG. 10 operates to refer to the "second distance information storage unit 64" in FIG. 9 and the "second position information storage unit 71" in FIG. 10. Then, whether or not there is reflected distance measurement light time point information not including "second distance information" and/or "second position information" is determined.

In the present embodiment, the "reflected distance measurement light time point information" might be determined to be the ineffective information, that is, blank indicating the failure to measure the distance information or the position information.

Thus, in the present embodiment, in ST21, whether or not there is a point (without position or distance information) corresponding to the blank (measurement failure data) and whether or not the measurement has completed are determined. In ST22, whether or not the measurement has been completed under all of the conditions is determined. When the measurement is determined to have not been completed in ST22, the processing proceeds to ST23.

In ST23, a process that is the same as that in ST9 in the first embodiment is performed. Specifically, the "adjustment processing unit (program) 45" in FIG. 4 operates to reduce an output of the semiconductor laser 8 (for example, by 50%) (an example of an output value reducing unit), reduce the sensitivity of the photodetector 17 (for example, ×100 to ×50), and drives the shutter 16a to arrange the film 16 in front of the photodetector 17.

With the output value of the semiconductor laser 8 reduced and the sensitivity and input of the photodetector 17 reduced, the 180° rotation is performed again, and steps ST1 to ST7 described above are executed. Thus, measurement information can be acquired from substantially all of the points on the target object, whereby highly accurate measurement can be achieved.

When it is determined in ST21 that there is no point (without position or distance information) corresponding to the blank (measurement failure data), the signal at the position in the signal saturated state is detected only based on the second wave of the "amplitude decreasing waveform" or after. Thus, the three-dimensional measurement device 1 needs not to further perform the 180° measurement. Thus, the dynamic range can be effectively widened, whereby cost increase can also be prevented.

All things considered, in the present embodiment, the dynamic range can be easily and promptly expanded as appropriate when three-dimensional data or the like on a part of a measurement target object is not acquirable so that the data can be acquired, as in the first embodiment described above.

Note that the present invention is not limited to the embodiments described above.

Explanation of Reference Numerals

1 . . . three-dimensional measurement device, 2 . . . base unit, 3 . . . leveling unit, 4 . . . frame unit, 5a, 5b . . . leveling screw, 6 . . . bearing, 7 . . . horizontal rotation unit, 8 . . . semiconductor laser, 9 . . . mirror, 10 . . . first beam splitter, 11 . . . second beam splitter, 12 . . . scanning mirror, 13 . . . vertical angle detection unit, 14 . . . vertical driving unit, 15 . . . imaging unit, 16 . . . film, 16a . . . shutter, 17 . . . photodetector, 18 . . . control calculation unit, 19 . . . acceleration sensor, 20 . . . display unit, 21 . . . operation unit, 25 . . . time measuring device, 30 . . . first various-information storage unit, 31 . . . laser emission processing unit (program), 32 . . . dynamic range storage unit, 33 . . . distance measurement light emission time point information storage unit, 34 . . . horizontal rotation time point information storage unit, 35 . . . vertical driving time point information storage unit, 36 . . . reflected light processing unit (program), 37 . . . reflected distance measurement light time point information storage unit, 38 . . . first distance information calculation processing unit (program) 40 . . . second various-information storage unit, 41 . . . first distance information storage unit, 42 . . . first position information calculation processing unit (program) 43 . . . position information storage unit, 44 . . . saturation information detection processing unit (program) 45, . . . adjustment processing unit (program)

What is claimed is:

1. A measurement device comprising:
a light source unit that sequentially emits a plurality of beams of distance measurement light to an identical target object, based on predetermined fixed output information;
a light reception unit that receives reflected light, from the target object, based on which the measurement device acquires measurement information on the basis of the reflected light received by the light reception unit; and
an output value reducing unit and/or an input value reducing unit, the output value reducing unit reducing a light output value of the light source unit, the input value reducing unit reducing an input value of the reflected light to the light reception unit;
an amplitude decreasing waveform generation processing unit configured to generate and store a plural amplitude decreasing waveform information from a plural amplitude decreasing waveform of a reception signal corresponding to light received by the light reception unit;
wherein the measurement device is configured to:
determine whether the plural amplitude decreasing waveform is within an appropriate range or not;
if not within the appropriate range, associate the amplitude decreasing waveform with ineffective information and store the ineffective information, and acquire the measurement information on the basis of usable amplitude decreasing waveform information that is not associated with the ineffective information.

2. The measurement device according to claim 1,
wherein the measurement device is configured to determine whether the measurement information includes unmeasurable information based on the plural amplitude decreasing waveform information associated with the ineffective information, and whether or not a measurement of a target object has been completed; and
when determining the measurement has not been completed, operating an output value reducing unit or an input value reducing unit, the output value reducing unit reducing a light output value of the light source unit, the input value reducing unit reducing an input value of the reflected light to the light reception unit.

3. The measurement device according to claim 2, wherein the input value reducing unit includes an arrangement and retraction mechanism for a sensitivity reduction film.

4. The measurement device according to claim 1, wherein the input value reducing unit includes an arrangement and retraction mechanism for a sensitivity reduction film.

5. A measurement method comprising:
sequentially irradiating an identical target object with a plurality of beams of distance measurement light from a light source unit based on predetermined fixed output information;
receiving reflected light from the target object with a light reception unit;
acquiring measurement information based on the reflected light received by the light reception unit;
reducing an output value of the light source unit and/or an input value of the reflected light to the light reception unit;

generating and storing a plural amplitude decreasing waveform information from a plural amplitude decreasing waveform of a reception signal corresponding to light received by the light reception unit;

determining whether the plural amplitude decreasing waveform is within an appropriate range or not;

if not within the appropriate range, associating the amplitude decreasing waveform with ineffective information and store the ineffective information, and acquiring the measurement information on the basis of usable amplitude decreasing waveform information that is not associated with the ineffective information.

\* \* \* \* \*